US006472090B1

(12) United States Patent
Colbow et al.

(10) Patent No.: US 6,472,090 B1
(45) Date of Patent: Oct. 29, 2002

(54) METHOD AND APPARATUS FOR OPERATING AN ELECTROCHEMICAL FUEL CELL WITH PERIODIC REACTANT STARVATION

(75) Inventors: Kevin Michael Colbow, North Vancouver; Marian van der Geest; Cindy J. Longley, both of Vancouver, all of (CA); Jens Müller, Blaustein (DE); Joy Roberts, Coquitlam; Jean St-Pierre, Vancouver, both of (CA); Peter Urban; Regina Wezel, both of Ulm (DE); David P. Wilkinson, North Vancouver; Jiujun Zhang, Richmond, both of (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/344,763

(22) Filed: Jun. 25, 1999

(51) Int. Cl.⁷ .................................................. H01M 8/04
(52) U.S. Cl. .............................. 429/13; 429/22; 429/23; 429/30
(58) Field of Search ............................. 429/13, 17, 19, 429/21, 22, 23, 30

(56) References Cited

U.S. PATENT DOCUMENTS

| 3,300,345 A | 1/1967 | Lyons |
| 3,379,572 A | 4/1968 | Gay |
| 4,243,731 A | 1/1981 | Cheron ........................ 429/13 |
| 4,279,711 A | 7/1981 | Vining et al. ........... 204/105 R |
| 4,294,892 A | 10/1981 | Alfenaar ....................... 429/13 |
| 4,420,544 A | 12/1983 | Lawson et al. ................ 429/13 |
| 4,555,452 A | 11/1985 | Kahara et al. ................ 429/13 |
| 4,810,595 A | 3/1989 | Kahara et al. ................ 429/16 |
| 4,910,099 A | 3/1990 | Gottesfeld .................... 420/13 |
| 5,432,021 A | 7/1995 | Wilkinson et al. ............. 429/17 |
| 5,436,086 A | 7/1995 | Seymour et al. .............. 429/17 |
| 5,482,680 A | 1/1996 | Wilkinson et al. .......... 422/177 |
| 5,601,936 A | 2/1997 | Dudfield et al. .............. 429/13 |
| 5,677,073 A | 10/1997 | Kawatsu ....................... 429/22 |
| 5,798,186 A | 8/1998 | Fletcher et al. ............... 429/13 |
| 6,096,448 A | * | 8/2000 | Wilkinson et al. ............. 429/13 |

FOREIGN PATENT DOCUMENTS

| CA | 2282434 | 9/1998 |
| EP | 0018693 | 11/1980 |
| EP | 0 692 835 A2 | 1/1996 |
| EP | 0 701 294 A1 | 3/1996 |
| EP | 0 710 996 A1 | 5/1996 |

(List continued on next page.)

OTHER PUBLICATIONS

Hammett, et al., "Long–Term Poisoning of Methanol Anodes," *Ber. Bunsenges. Phys. Chem.* 94:1014–1020 (1990).

*Primary Examiner*—Patrick Ryan
*Assistant Examiner*—Jonathan Crepeau
(74) *Attorney, Agent, or Firm*—McAndrews, Held & Malloy, Ltd.

(57) ABSTRACT

An electrochemical fuel cell is operated with periodic reactant starvation at either or both electrodes. Periodic reactant starvation conditions cause a change in the potential of the starved electrode and may result in the removal of electrocatalyst poisons and in improved fuel cell performance. This technique may have other beneficial effects at the electrodes, including performance improvements due to water management effects or localized heating effects at the starved electrode. In a preferred method, while successive localized portions of a fuel cell electrode are periodically reactant starved, the remainder of the fuel cell electrode remains electrochemically active and saturated with reactant such that the fuel cell is able to continue to generate power.

31 Claims, 12 Drawing Sheets

FOREIGN PATENT DOCUMENTS

| | | |
|---|---|---|
| EP | 0 736 921 A1 | 10/1996 |
| EP | 0 911 629 A1 | 4/1999 |
| EP | 0 911 898 A1 | 4/1999 |
| GB | 1296831 | 11/1972 |
| GB | 2 290 409 A | 12/1995 |
| JP | 63-026961 | 2/1988 |
| JP | 63-170865 | 7/1988 |
| JP | 7-302607 | 11/1995 |
| JP | 10-270065 | 10/1998 |
| WO | WO 95/18469 | 7/1995 |
| WO | WO 98/42038 | 9/1998 |
| WO | WO 99/34465 | 7/1999 |
| WO | WO 99/59217 | 11/1999 |

* cited by examiner

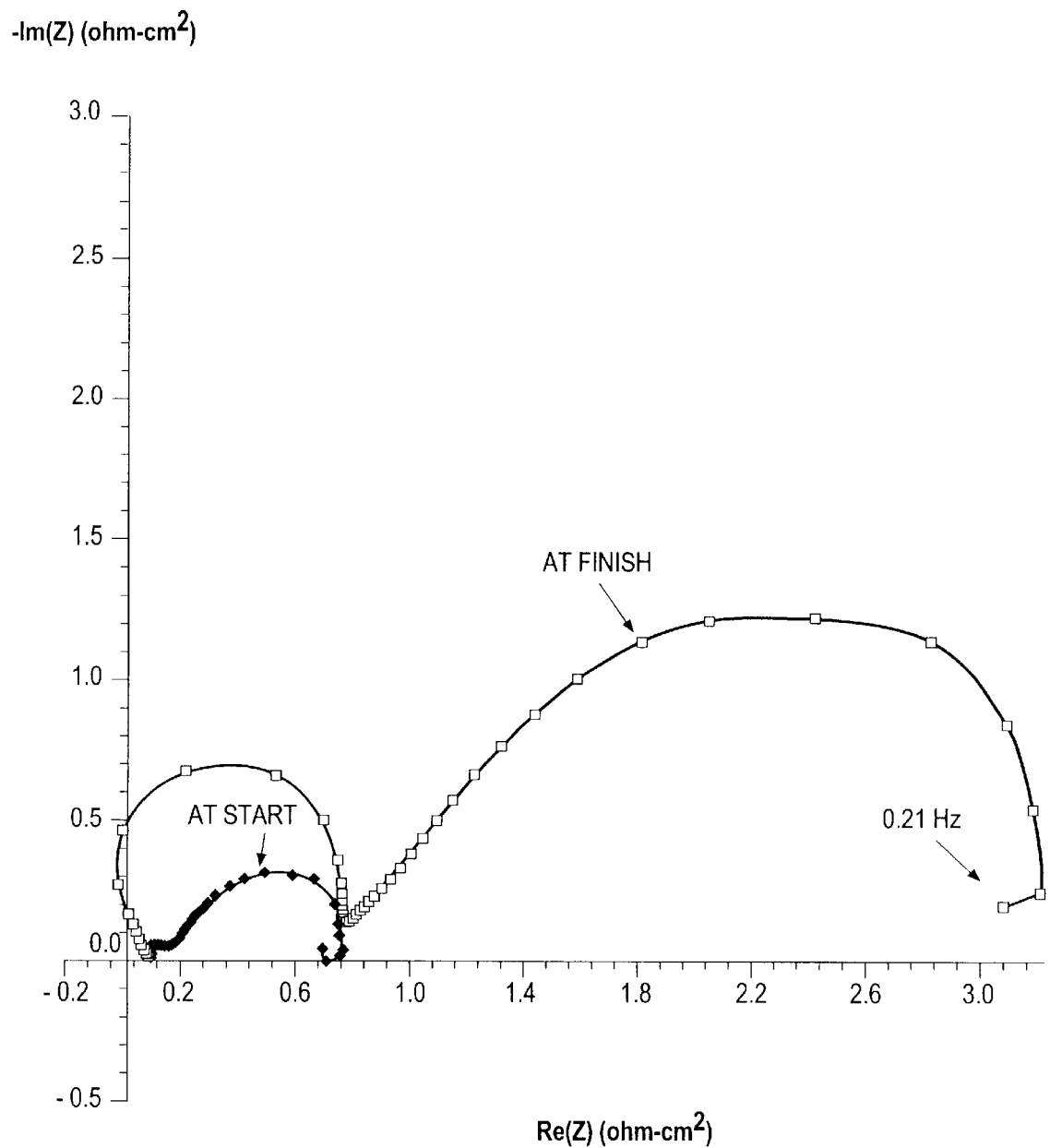

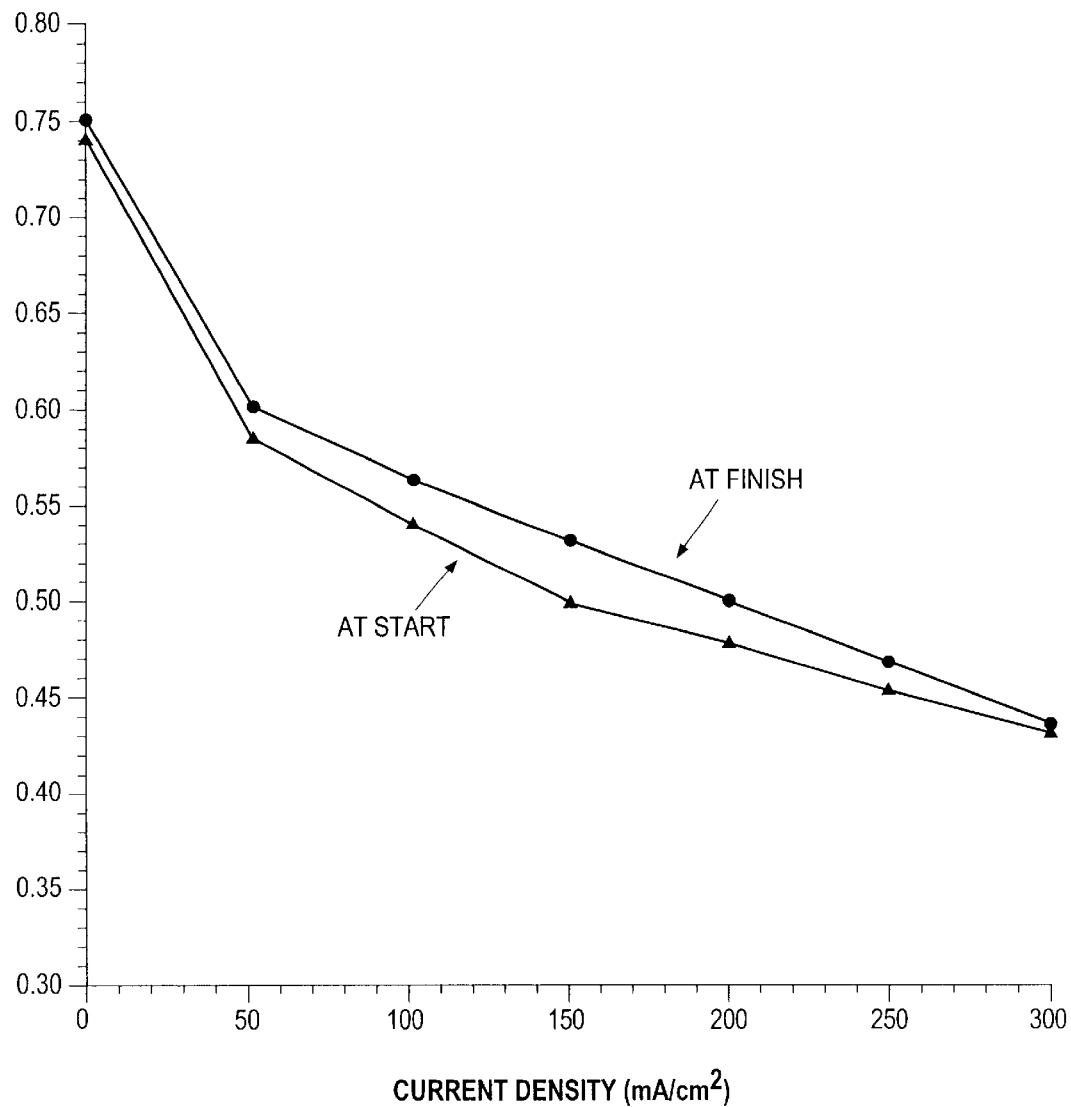

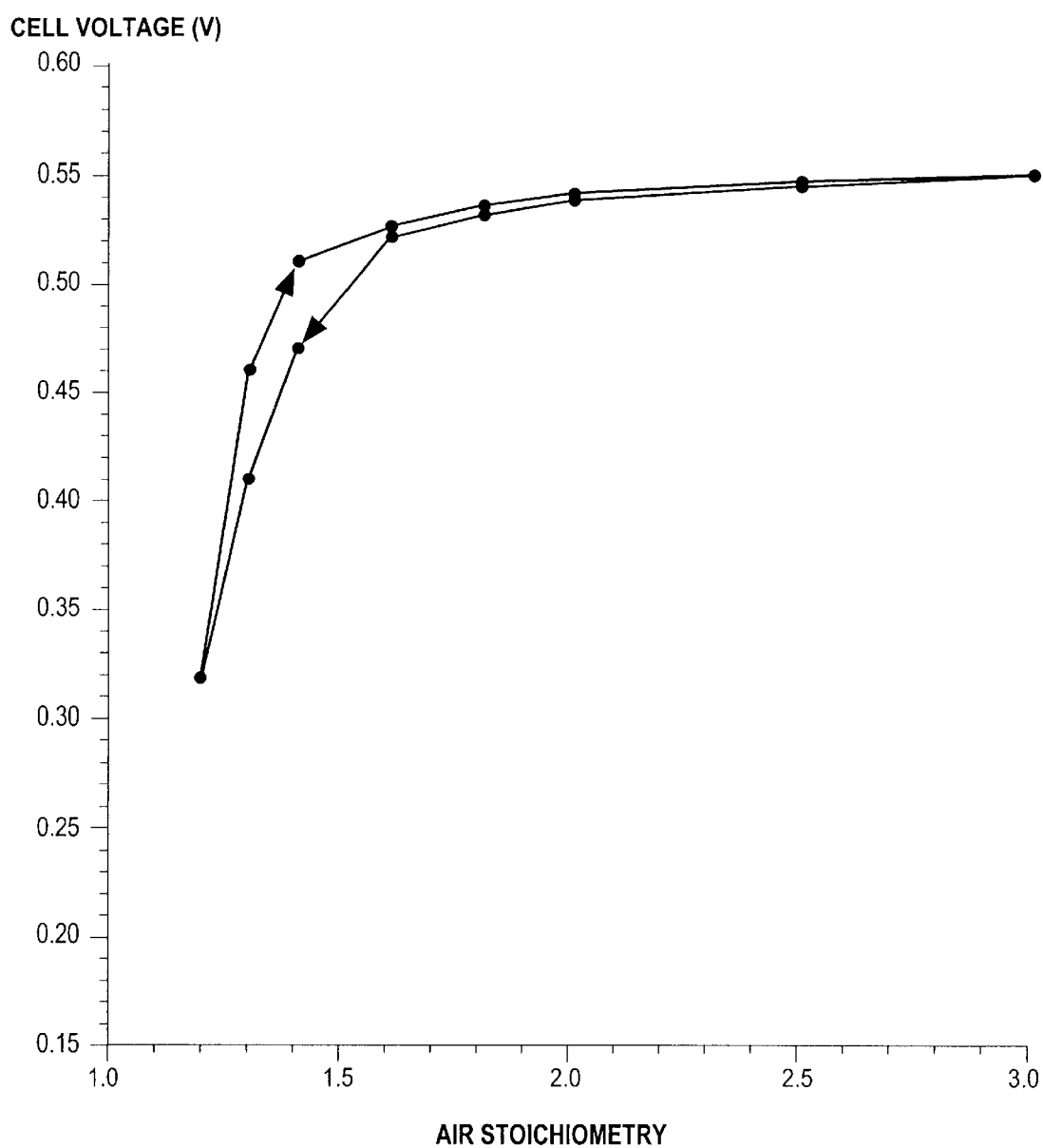

METHOD AND APPARATUS FOR OPERATING AN ELECTROCHEMICAL FUEL CELL WITH PERIODIC REACTANT STARVATION

FIELD OF THE INVENTION

The present invention relates to a method and apparatus for operating an electrochemical fuel cell with periodic reactant starvation at an electrode. More particularly, the method comprises periodically momentarily fuel starving at least a portion of the anode of an operational fuel cell or periodically momentarily oxidant starving at least a portion of the cathode of an operational fuel cell or both. The method and apparatus may be used to improve fuel cell performance without suspending the generation of power by the fuel cell.

BACKGROUND OF THE INVENTION

Electrochemical fuel cells convert reactants, namely fuel and oxidant fluid streams, to produce electric power and reaction products. Solid polymer electrochemical fuel cells generally employ a membrane electrode assembly ("MEA") comprising a solid polymer electrolyte or ion-exchange membrane disposed between two porous electrically conductive electrode layers. The anode and cathode each comprise electrocatalyst, which is typically disposed at the membrane/electrode layer interface, to induce the desired electrochemical reaction.

At the anode, the fuel moves through the porous anode layer and is oxidized at the anode electrocatalyst to produce protons and electrons. The protons migrate through the ion exchange membrane towards the cathode. On the other side of the membrane, the oxidant moves through the porous cathode and reacts with the protons at the cathode electrocatalyst. The electrons travel from the anode to the cathode through an external circuit, producing an electrical current.

Electrochemical fuel cells can operate using various reactants. For example, the fuel stream may be substantially pure hydrogen gas, a gaseous hydrogen-containing reformate stream, or methanol in a direct methanol fuel cell. The oxidant may be substantially pure oxygen or a dilute stream such as air containing oxygen.

The fuel stream may contain impurities that do not contribute to, and may actually inhibit, the desired electrochemical reaction at the anode. These impurities may, for example, originate from the fuel stream supply itself, or may be generated in situ in the fuel cell, for example, as intermediate species during the fuel cell reactions. Further, impurities may enter the fuel stream from elsewhere in the system. In a like manner, although less commonly, the oxidant stream may also contain impurities which may inhibit the desired electrochemical reaction at the cathode. Again, impurities may originate within the cathode stream, may be generated in situ, or may originate elsewhere in the system (e.g., fuel stream species may crossover from the anode to the cathode side of a solid polymer fuel cell by diffusion through the membrane electrolyte). Some of these impurities may be chemically adsorbed or physically deposited on the surface of the electrode electrocatalyst, blocking the active electrocatalyst sites and preventing these portions of the electrode electrocatalyst from inducing the desired electrochemical fuel oxidation or oxidant reduction reactions. Such impurities are known as electrocatalyst "poisons" and their effect on electrochemical fuel cells is known as "electrocatalyst poisoning". Electrocatalyst poisoning thus results in reduced fuel cell performance, where fuel cell performance is defined as the voltage output from the cell for a given current density. Higher performance is associated with higher voltage for a given current density or higher current for a given voltage.

In the absence of countermeasures, the adsorption or deposition of electrocatalyst poisons may be cumulative, so even minute concentrations of poisons in a fuel stream, may for instance, over time, result in a degree of electrocatalyst poisoning which is detrimental to fuel cell performance.

Reformate streams derived from hydrocarbons or oxygenated hydrocarbons typically contain a high concentration of hydrogen fuel, but typically also contain electrocatalyst poisons such as carbon monoxide. To reduce the effects of anode electrocatalyst poisoning, it is known to pre-treat the fuel supply stream prior to directing it to the fuel cell. For example, pre-treatment methods may employ catalytic or other methods to convert carbon monoxide to carbon dioxide. However, known pretreatment methods for reformate streams cannot efficiently remove 100% of the carbon monoxide. Even trace amounts less than 10 ppm can eventually result in electrocatalyst poisoning which causes a reduction in fuel cell performance.

Substances other than carbon monoxide are also known to poison fuel cell electrocatalysts. Depending on the type of fuel and the fuel processing methods, impurities in the fuel stream may be present in quantities sufficient to poison the electrocatalyst and reduce fuel cell performance. Fuel cell components and other fluid streams in the fuel cell system may also be a source of impurities that may result in poisoning of the electrocatalyst on either or both electrodes. For example, fuel cell separator plates are commonly made from graphite. Organic impurities in the graphite may leach out and poison the electrocatalyst. Other poisons may be generated by the reaction of substances in the reactant streams with the fuel cell component materials. Alternatively, substances present in one reactant stream may diffuse through the electrolyte and thus crossover from one electrode to the other. The crossover substance may be acceptable at the first electrode but may represent a poison at the other (for instance, in principle, methanol crossover from the anode to the cathode in a direct methanol fuel cell can depolarize or otherwise adversely affect the cathode).

What constitutes a poison may depend on the nature of the fuel cell. For example, whereas methanol is the fuel in a direct methanol fuel cell, in a hydrogen fuel cell operating on a methanol reformate stream, traces of unreformed methanol can be detrimental to the electrocatalyst performance at the anode.

Conventional methods for addressing the problem of electrode electrocatalyst poisoning include purging the electrode with an inert gas such as nitrogen. However, such purging methods involve suspending the generation of power by the fuel cell. A secondary power source is therefore needed to provide power while the fuel cell electrode is being purged.

Another approach for removing carbon monoxide or other poisons from an electrocatalyst comprises introducing a "clean" reactant stream containing substantially no poisons to a poisoned fuel cell electrode. Where adsorption is reversible, an equilibrium process induced by introducing a clean reactant stream results in some rejuvenation of the electrocatalyst. However, a disadvantage of this approach is that it is generally not effective against irreversibly adsorbed poisons. Furthermore, the recovery of the electrode electrocatalyst by such an equilibrium process can be very slow, during which time the fuel cell is not able to operate at full capacity.

Another approach to counteract carbon monoxide electrocatalyst poisoning at the anode is to continuously introduce a low concentration of oxygen into the fuel stream upstream of the fuel cell, as disclosed in Gottesfeld U.S. Pat. No. 4,910,099. However, there are several disadvantages to Gottesfeld's method which influence fuel cell performance and efficiency. For example, an oxygen bleed results in parasitic losses, undesirable localized exothermic reactions at the anode, and dilution of the fuel stream.

U.S. patent application Ser. No. 08/998,133 filed Dec. 23, 1997, now U.S. Pat. No. 6,096,448, entitled "Method and Apparatus for Operating an Electrochemical Fuel Cell With Periodic Fuel Starvation At The Anode" is incorporated herein by reference in its entirety.

It is apparent from the prior art that there is a need for an improved method and apparatus for rejuvenating a fuel cell electrode electrocatalyst by removing poisons therefrom, which does not involve suspending the availability of the fuel cell to generate power.

SUMMARY OF THE INVENTION

A fuel cell is operated to produce electrical power for an electrical load by supplying an oxidant stream to the fuel cell cathode, and a fuel stream to the fuel cell anode. The present method comprises periodically oxidant starving at least a portion of the cathode, while continuing to produce electrical power from the fuel cell. Typically, when the method is applied, the fuel cell performance after the starvation is improved relative to the performance just prior to the starvation. A performance improvement may result for various reasons. For instance, the production of water at the cathode may be briefly reduced thereby improving water management in the cell. Or, an improvement may result from the removal of electrocatalyst poisons, which is facilitated as the cathode potential decreases as occurs during oxidant starvation at the cathode. Oxidant starvation may have other benefits or effects at the electrodes, for example with regards to any heat generated as a result of the starvation. For example, this heat may be effective in regenerating the interfaces within membrane electrode assemblies after prolonged fuel cell operation.

The fuel cell is preferably a solid polymer fuel cell. The fuel and oxidant streams may be gaseous or liquid. The fuel cell may, for example, be a direct methanol fuel cell.

In a first embodiment, the method for oxidant starving at least a portion of the fuel cell cathode comprises periodically interrupting the supply of the oxidant stream to the fuel cell cathode. This can be accomplished, for example, by adjusting a valve upstream of the fuel cell cathode, stopping an oxidant supply compressor, or diverting the oxidant supply stream away from the fuel cell cathode.

Where the fuel cell is one of a plurality of fuel cells, for example, arranged in a fuel cell stack, the method preferably comprises preventing the simultaneous interruption of the supply of oxidant to each cathode of the plurality of fuel cells. This reduces the magnitude of fluctuations in electrical power output from the stack.

The first embodiment of the method may further comprise closing a valve downstream of the fuel cell cathode substantially simultaneously with the interruption of supply of the oxidant stream to prevent the oxidant stream from being exhausted from the fuel cell.

In a second embodiment, the method for oxidant starving at least a portion of the fuel cell cathode comprises periodically introducing pulses of a substantially oxidant-free fluid into the oxidant stream upstream of the fuel cell cathode. The substantially oxidant-free fluid moves through the cathode flow field, thereby oxidant starving successive portions of the cathode.

The substantially oxidant-free fluid may contain some oxidant, provided the oxidant concentration is sufficiently low to induce oxidant starvation of portions of the cathode with which the fluid is in is contact, and thereby give the desired recovery in performance of the fuel cell. Preferably the substantially oxidant-free fluid contains essentially no oxidant and is substantially unreactive at the fuel cell cathode, for example, nitrogen, argon, and helium. Alternatively, the substantially oxidant-free fluid may comprise quantities of components that participate in and enhance the reactions at the cathode but are not themselves detrimental to fuel cell performance.

The oxidant and the substantially oxidant-free fluid may both be in the same phase or different phases. In particular, the oxidant stream may be a gas stream and the substantially oxidant-free fluid may also be gaseous.

The method may further comprise introducing a substantially oxidant-free fluid pulse that is cooler than the internal operating temperature of the fuel cell. In this embodiment, the substantially oxidant-free fluid may act as a coolant for the fuel cell. Similarly, substantially oxidant-free fluid could be introduced at a temperature higher than the operating temperature of the fuel cell, in situations where it is desirable to raise the fuel cell operating temperature.

The method for introducing the substantially oxidant-free pulse may comprise the steps of periodically closing an oxidant supply valve to stop the flow of the oxidant stream upstream of the fuel cell and simultaneously opening an interrupt valve to introduce a pulse of a substantially oxidant-free fluid stream into the oxidant stream. In a variation on this embodiment, the oxidant supply stream is maintained at a lower pressure than the substantially oxidant-free fluid stream, and the method of introducing the substantially oxidant-free fluid comprises periodically opening an interrupt valve to introduce a pulse of a substantially oxidant-free fluid stream into the oxidant stream.

In a third embodiment, the method for oxidant starving at least a portion of the fuel cell cathode comprises periodically connecting a transient electrical load to draw electrical power from the fuel cell. Preferably, the rate of supply of the oxidant stream to the fuel cell cathode is not increased in response to the connection of the transient load, so that oxidant in the fuel cell is consumed at a faster rate than it is supplied and at least a portion of the cathode becomes oxidant starved. The transient electrical load may comprise a capacitor which may be used to release an electrical charge, for example, when the power demand from the electrical load exceeds the power output of the fuel cell during times when the fuel cell is undergoing rejuvenation.

Where the fuel cell is one of a plurality of fuel cells, for example, arranged in a fuel cell stack, preferably the periodic connection of the transient load is not connected to draw electrical power from all the fuel cells simultaneously.

In the embodiments described above the oxidant starvation may be induced at regular time intervals, for example, by interrupting the oxidant supply, introducing substantially oxidant-free pulses or connecting a transient load at regular time intervals. Alternatively, the method may comprise monitoring an operational parameter (e.g., cell voltage) of the fuel cell and adjusting the frequency with which the oxidant starvation is induced in response to the value of the monitored parameter. Similarly, the duration of the oxidant starvation may be fixed or varied, for example in response to a monitored operational parameter.

One or both the duration and frequency of the periodic interruptions may be selected as a function of the concentration of the catalyst poisoning species in the oxidant stream.

In the above embodiments, it is generally preferred that cell reversal is avoided. However, an embodiment of the method for operating a fuel cell assembly comprising a plurality of fuel cells, may comprise periodically oxidant starving at least one, but not all, of the fuel cell cathodes such that a cell reversal occurs, while continuing to generate electrical power from the remaining cells. Preferably however, the oxidant starvation is limited so that the cell reversal is not prolonged.

In a first embodiment, a fuel cell apparatus comprises an oxidant supply system for directing an oxidant stream to a cathode of the fuel cell, a flow controller for periodically interrupting the supply of the oxidant stream to the cathode, and an actuator associated with the flow controller for controlling the frequency and duration of the interruptions.

The flow controller may comprise an oxidant supply valve located upstream of the cathode, and the actuator is preferably connected to periodically partially or preferably fully close the oxidant supply valve to interrupt the oxidant supply to the cathode. The fuel cell apparatus may further comprise an oxidant exhaust stream valve located downstream of the cathode which is activated by the actuator (or a second actuator activated in coordination with the first actuator) to open and close in coordination with the oxidant supply valve.

The oxidant supply system may comprise a compressor for directing an oxidant stream to the cathode. In this embodiment, the actuator may, for example, be connected to periodically deactivate the compressor and thereby interrupt the oxidant supply to the cathode. An oxidant exhaust stream valve located downstream of the cathode may be activated by the actuator in coordination with the compressor activation to close the valve when the compressor is periodically deactivated, and open the valve when the compressor is re-activated.

The flow controller may comprise a diverter located upstream of the cathode for diverting the oxidant stream away from the cathode. The diverter may be periodically actuated by the actuator.

A sensor may be employed that responds to fuel cell performance (e.g., voltage) or, where applicable, that detects the concentration of catalyst poisons in the oxidant stream. The sensor may provide an output signal to the actuator that adjusts the frequency and/or duration of the interruptions in response to the sensor output signal.

The fuel cell may comprise a plurality of independent oxidant flow field channels for directing the oxidant stream in contact with the cathode. Each one of the flow field channels directs the oxidant stream to a discrete region of the cathode and the supply of the oxidant stream to each one of the regions can be controlled independently from the supply of the oxidant stream to other ones of the regions. In this embodiment, selected regions of the cathode can be oxidant starved while other regions continue to contribute to the fuel cell power output.

In a second embodiment, a fuel cell apparatus comprises a oxidant supply system for directing an oxidant stream to a cathode of the fuel cell, a source of a substantially oxidant-free fluid, and a flow controller for periodically introducing pulses of the substantially oxidant-free fluid into the oxidant stream upstream of the fuel cell cathode. The flow controller may comprise an interrupt valve for controlling the introduction of the substantially oxidant-free fluid stream into the oxidant stream.

In a third embodiment, a fuel cell apparatus comprises a transient electrical load that is selectively electrically connected to draw electrical power from the fuel cell. A switch periodically electrically connects the transient electrical load to draw electrical power from the fuel cell. An actuator associated with the switch controls the frequency and duration of the electrical connection. The transient load may comprise a capacitor for storing an electrical charge that can be released to the electrical load.

It may be advantageous to perform periodic fuel starvation as well as oxidant starvation, either simultaneously or in a preferred sequence. The application of a transient load may be the simplest way to implement simultaneous fuel and oxidant starvation.

The embodiments described above may be used to improve fuel cell performance and increase the service life of an electrochemical fuel cell.

BRIEF DESCRIPTION OF THE DRAWINGS

The advantages, nature and additional features of the invention will become more apparent from the following description, together with the accompanying drawings, in which:

FIG. 9B is a comparative plot of the in situ AC impedance of a fuel cell at the start and at the finish of an extended operating period. This fuel cell was not subjected to periodic fuel starvation over the extended operating period;

FIG. 10 is a comparative plot of the polarization curves (voltage as a function of current density) for a direct methanol fuel cell before and after application of a transient load;

FIG. 11 is a plot of fuel cell voltage as a function of air stoichiometry as the air (oxidant) stoichiometry is decreased and then increased.

DETAILED DESCRIPTION OF THE PREFERRED EMBODIMENTS

Using the present method and apparatus, an electrochemical fuel cell is operated with periodic reactant starvation at an electrode while not suspending the generation of power. In the context of this disclosure, fuel starvation is defined as a reduction in fuel supply to the anode electrocatalyst which results in the anode potential increasing (that is, moving towards the cathode potential). Further in the context of this disclosure, oxidant starvation is defined as a reduction in oxidant supply to the cathode electrocatalyst which results in the cathode potential decreasing (that is, moving towards the anode potential). This reactant starvation technique may have several beneficial effects at the electrodes. For example, it is believed that an increased anode potential results in the oxidation and removal of poisons from the fuel starved portion of the anode electrocatalyst. A performance improvement from oxidant starvation may result from differences in the state of the water distribution in the cathode. During oxidant starvation, less product water may be generated at the cathode. On the other hand, in fuel cells having generally wetter cathodes (such as direct methanol fuel cells where significant water may cross over from the anode to the cathode through the membrane electrolyte), oxidant starvation at the cathode may result in flooding. Flooding implies that more of the cathode area is wetted and the mobility of water on wet areas in the cathode is expected to be higher than on dry areas. Thus, upon a return to normal operating conditions following starvation, cathode water may generally be more mobile and hence more easily removed. As another possible benefit, it is proposed that a decreased cathode potential may result in the reduction and removal of poisons from the oxidant starved portion of the cathode electrocatalyst. Still further, oxidant starvation may result in increased heat generation due to an increased overvoltage at the cathode. This heat may be effective in regenerating the membrane-cathode interfaces following prolonged operation of the fuel cell.

Figure 1:
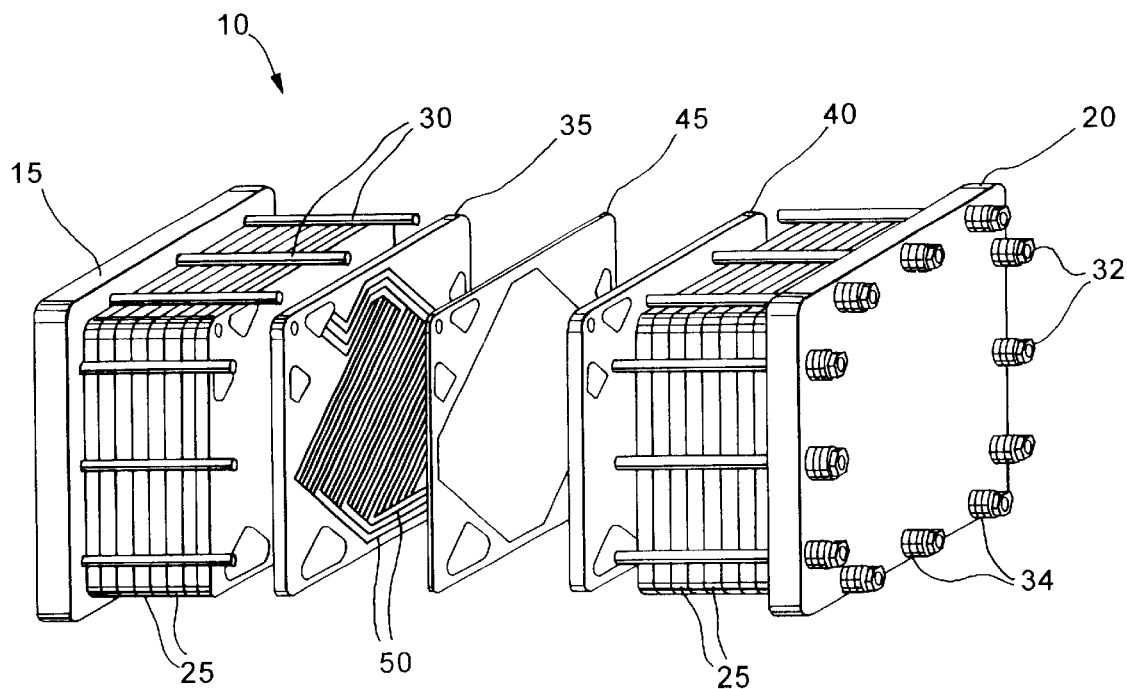
FIG. 1 is an exploded perspective view of a conventional, prior art fuel cell stack.

FIG. 1 illustrates, in exploded view, a solid polymer fuel cell stack 10, including a pair of end plate assemblies 15, 20 and a plurality of fuel cell assemblies 25. Tie rods 30 extend between end plate assemblies 15 and 20 to retain and secure stack assembly 10 in its assembled state with fastening nuts 32. Springs 34, threaded on tie rods 30, are interposed between fastening nuts 32 and end plate 20 to apply resilient compressive force to stack 10 in the longitudinal direction. Reactant and coolant fluid streams are supplied to and exhausted from internal manifolds and passages in stack 10 via inlet and outlet ports (not shown in FIG. 1) in end plate 15. As shown by the exploded portion of FIG. 1, each fuel cell assembly 25 includes an anode flow field plate 35, a cathode flow field plate 40, and an MEA 45 interposed between plates 35 and 40. Plates 35 and 40 act as current collectors and provide a fluid barrier for separating reactant fluids supplied to the anode and cathode. At the interface between MEA 45 and plates 35 and 40, fluid flow fields 50 direct the reactant fluids to the electrodes. Fluid flow field 50 typically comprises a plurality of fluid flow channels formed in the major surfaces of plates 35 and 40 facing MEA 45. One purpose of fluid flow field 50 is to distribute the reactant fluid to the entire surface of the respective electrodes, namely the anode on the fuel side and the cathode on the oxidant side.

FIGS. 2 and 4–7 are schematic depictions of various examples of apparatus which may be used to periodically reactant starve at least a portion of the electrodes in fuel cell stack 100. For simplicity, apparatus for only one of the reactants is shown. Stack 100 may also have a similar arrangement for the other reactant apparatus. Stack 100 includes end plates 130, 140, a reactant inlet port 150 in end plate 130, and a reactant supply manifold 160 for supplying a reactant stream to a plurality of individual fuel cells.

Reactant flow fields associated with each fuel cell are represented by lines 170. A reactant exhaust manifold 180 removes the reactant depleted stream from stack 100 through reactant outlet port 190 in end plate 140.

The reactant stream is directed to stack 100 from a reactant source such as a reservoir, storage tank 102, pressurized storage vessel 105 (see FIG. 5) (or in the case of the oxidant, ambient air), or reactant processor, for example, comprising a fuel reformer or a reactant purifier. In some embodiments, (see FIGS. 2 and 4–6), especially when the reactant source is not pressurized, a pump or compressor 110 may be used to direct the reactant stream to stack 100.

Reactant supply valve 120 controls the supply of reactant to stack 100. Reactant supply to stack 100 may be interrupted by closing reactant supply valve 120.

Figure 2:
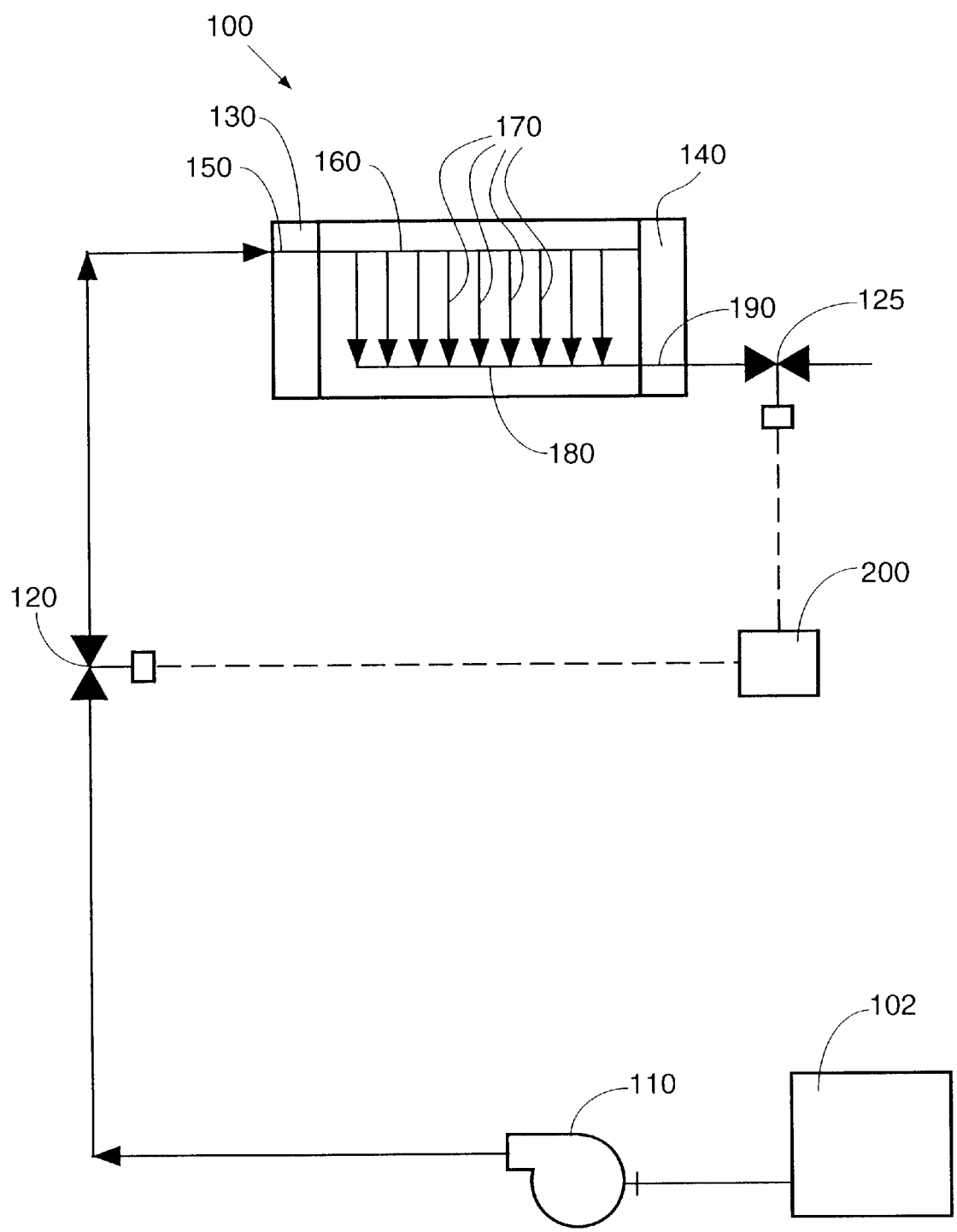
FIGS. 2 and 4–7 are schematic illustrations of embodiments of apparatus that may be employed to periodically reactant starve at least a portion of the electrodes in a fuel cell stack.

Referring now to FIG. 2, when fuel cell stack 100 is connected and operating to deliver electrical power to a load, and reactant supply valve 120 is closed or adjusted to reduce the rate of supply of reactant to less than that demanded to satisfy the load, the fuel cell electrodes become reactant starved. The cell voltage drops as the reactant inside stack 100 is consumed by the electrochemical reaction that is induced to supply electrical current to the electrical load. In the case where the rate of supply of fuel is reduced (i.e., fuel starvation), the anode potential increases. In the case where the rate of supply of oxidant is reduced (i.e., oxidant starvation), the cathode potential decreases and changes may occur with regards to the water management situation at the cathode. An increase in anode potential preferably results in the oxidation of electrocatalyst poisons on the anode electrocatalyst. The oxidized poisons become part of the fuel exhaust stream. A decrease in cathode potential may result in the reduction of electrocatalyst poisons on the cathode electrocatalyst to become part of the oxidant exhaust stream. Preferably, the extent to which the electrode is reactant starved and the resultant cell voltage drop is controlled by opening reactant supply valve 120 before cell reversal occurs. Cell reversal occurs when either the anode potential increases and becomes more positive than the cathode potential or the cathode potential decreases and becomes more negative than the anode potential, resulting in a negative cell voltage. In this situation the cell is consuming, rather than producing, electrical power. Momentary instances of slight cell reversal may not damage the fuel cell, but prolonged cell reversal or large negative cell voltages can cause permanent damage. Cell reversal caused by fuel starvation may result in the production of oxygen at the anode through the oxidation of water. Initially, the oxygen produced by cell reversal may momentarily assist in the oxidation of electrocatalyst poisons, but after a more prolonged period, permanent damage may be caused by the oxidation of some of the fuel cell components. Accordingly, it may be preferable to control the duration and frequency of the periodic reactant supply interruptions, using controller 200, to avoid cell reversal while still achieving the desired removal of poisons from the fuel cell electrocatalyst.

The preferred duration depends upon many factors. For example, these factors include the type and concentration of the electrocatalyst poisons, the water management situation, the cell design, the physical characteristics of the fuel cell, the reactant flow rate, reactant pressure, and reactant stoichiometry (defined as the ratio of fuel supplied to that consumed in the generation of electrical power in the fuel cell). The duration of the periodic reactant supply interruptions may be, for example, increased until the fuel cell almost ceases to produce useful electrical power or reaches a condition where cell reversal is about to occur. Fuel cell operating parameters, which are indicators of such conditions, may be monitored to determine when these limits are approached. The duration of reactant starvation may be adjusted in response to one or more monitored fuel cell operating parameters to enhance performance while preventing permanent damage to the fuel cell caused by cell reversal. Suitable operating parameters may include cell voltage, current, power output, poison concentration in the reactant stream and temperature.

With respect to frequency, the interruptions may be spaced at fixed time intervals or variable time intervals which are adjusted according to factors such as, for example, the concentration of poisons to which the electrode electrocatalyst is exposed, and the configuration of the flow field. For example, for fuel cells subjected to lower poison concentrations, it is possible to lengthen the intervals between periodic reactant supply interruptions.

In some cases the balance between the duration and frequency of interruptions should be considered in view of the particular application for which the fuel cell is used. For example, some applications are more sensitive to one of either the magnitude or frequency of power fluctuations. That is, if the fuel cell is used for an application that is sensitive to the frequency of power fluctuations, it may be desirable to periodically starve the fuel cell for longer durations at a lower frequency. Conversely, other applications may be more sensitive to the magnitude of power fluctuations, in which case it may be preferable to increase the frequency of reactant supply interruptions and decrease the duration of each periodic interruption.

Closing reactant supply valve 120 may cause an increase in the transmembrane pressure differential across the MEAs. To avoid damage to the ion exchange membrane, preferably controller 200 opens and closes reactant exhaust valve 125 substantially simultaneously with reactant supply valve 120. In this way, the electrode will be reactant starved once the reactant remaining in stack 100 is consumed, but there will not be a significant sudden pressure drop on the reactant side of the MEA.

In another embodiment of an apparatus, the effect of power output interruptions can be reduced by dividing the electrochemically active areas of each fuel cell into separate regions, with each region having a separate reactant flow field and reactant supply valve 120. Then the interruption of the reactant supply to different regions of the same fuel cell can be staggered, so that not all portions of the active area are starved at the same time.

In some embodiments, reactant supply manifold 160 may comprise a mechanism, such as for example a rotary valve disposed within manifold 160, for controlling the distribution of reactant to the individual fuel cells. Preferably, the rotary valve controls the reactant supply stream to prevent the simultaneous interruption of the reactant supply stream to all of the fuel cells in stack 100.

In applications where a plurality of fuel cell stacks are used in combination to supply electrical power it is advantageous to stagger the timing for the reactant interruptions to each stack to reduce the effect of the interruptions on total power output.

In variations of the embodiment illustrated in FIG. 2, periodic interruptions in the supply of reactant to stack 100 may be accomplished without using a reactant supply valve 120, by using controller 200 to periodically stop pump 110 thereby stopping the supply of reactant to stack 100, or by periodically temporarily diverting the reactant stream away from the stack reactant inlet port 150.

Figure 3:
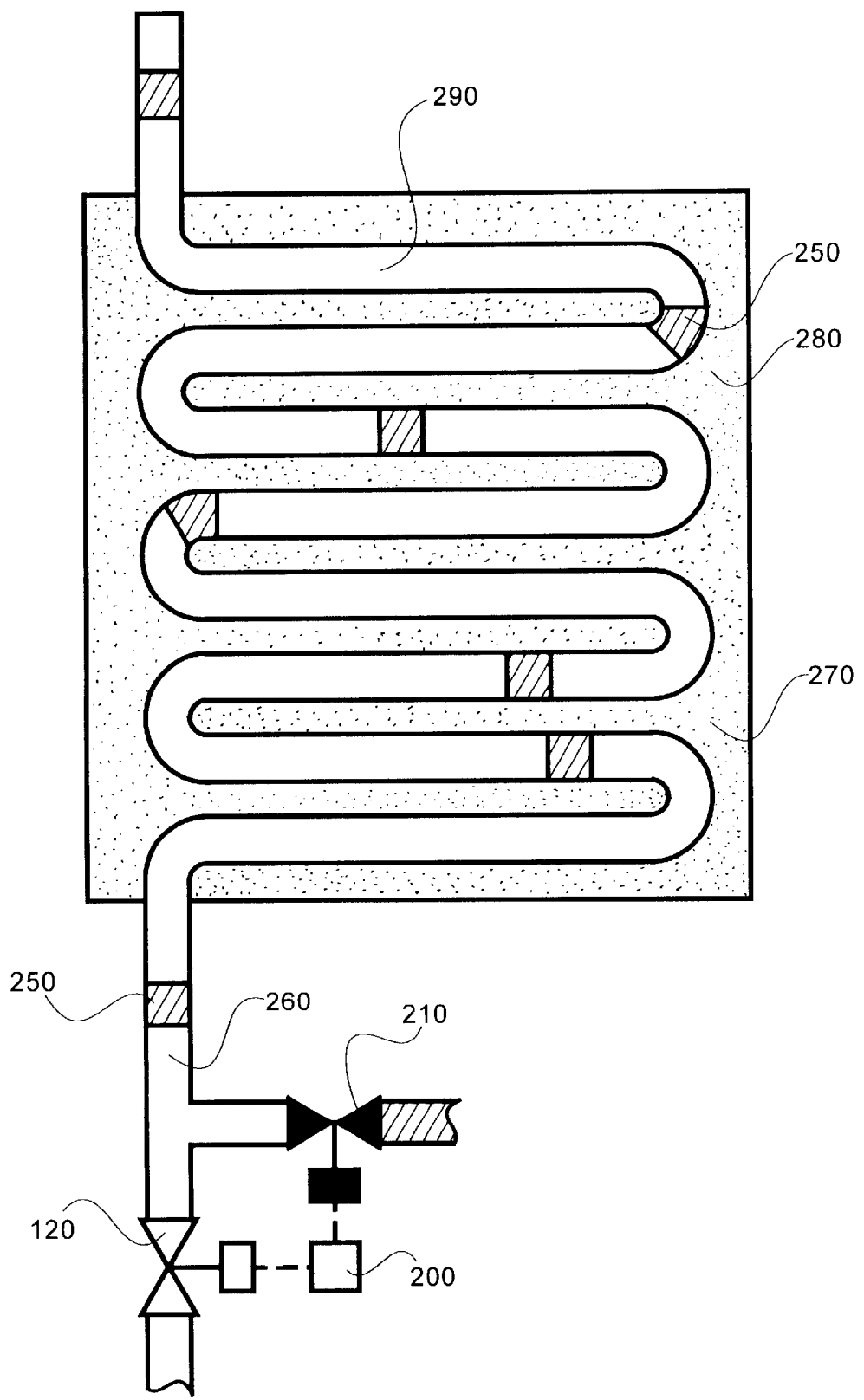
FIG. 3 is a side sectional view of a fuel cell reactant flow field and electrode depicting substantially reactant-free fluid pulses moving through the reactant flow field in the reactant stream.

In other embodiments of the method, localized starvation of the electrode is accomplished by introducing substantially reactant-free fluid pulses 250 into the reactant stream using apparatus such as that illustrated in FIG. 3. In operation, with reference to the embodiment depicted by FIGS. 3 and 4, reactant supply valve 120 is open and interrupt valve 210 is closed. Periodically interrupt valve 210 is momentarily opened while controller 200 synchronously closes reactant supply valve 120, thereby introducing substantially reactant-free fluid pulses 250 into reactant stream 260. The substantially reactant-free fluid may be introduced from a fluid source such as vessel 215 in FIG. 4. In these embodiments, controller 200 coordinates the operation of valves 120 and 210 so that they remain in opposite open or closed positions. An advantage of this approach is that it is less likely to create a sudden change in transmembrane pressure differential across the MEAs compared to interrupting the reactant supply as described above.

Preferably, the substantially reactant-free fluid stream 250 is introduced into the reactant stream 260 at substantially the same pressure that the reactant stream is supplied to stack 100. It is believed that this promotes the flow of a discrete substantially reactant-free fluid pulse through the reactant side flow field. A large pressure differential between the reactant stream and the substantially reactant-free fluid stream may cause the higher pressure fluid to disperse into the lower pressure fluid, reducing the localized starvation effect.

The flow field design may also affect the extent to which the fluid streams mix as they move through the fuel cells. It may be desirable to control the pressures and design the flow field to reduce mixing which may inhibit the formation of localized reactant starvation conditions at the electrode.

The fluid pressures need not be precisely matched. In some embodiments it may be desirable for the substantially reactant-free fluid to be at a slightly higher pressure than the reactant stream. An advantage of this is that the slight pressure differential will prevent reactant from contaminating the substantially reactant-free fluid source, and the substantially reactant-free fluid can be introduced into the reactant stream by opening interrupt valve 210, without the necessity of closing reactant supply valve 120.

The volume of the substantially reactant-free fluid pulses 250 can be as much as the open volume of reactant flow field 290 and porous electrode 270. However, preferably, the volume of substantially reactant-free fluid pulses 250 is much less than the open volume of reactant flow field 290 and porous electrode 270, thereby ensuring that the majority of each electrode 270 remains saturated with reactant and electrochemically active. The electrochemically active areas continue to be available to produce an electrical current while only successive localized portions 280 of the active area are momentarily reactant starved to effect the desired result of starvation. Using this embodiment it is possible to reduce cell voltage fluctuations which may occur when the entire electrode 270 is simultaneously reactant starved. Accordingly, it is desirable for the volume of substantially reactant-free fluid pulses 250 to be less than the open channel volume of reactant flow field 290.

A variety of gases or liquids are suitable for use as the substantially reactant-free fluid. The choice of substantially reactant-free fluid depends upon factors such as cost, compatibility, effectiveness, and availability of the fluid elsewhere in the fuel cell system. The substantially reactant-free fluid may be unreactive or may comprise reactive components that participate in and enhance the desired performance improvement but are not themselves catalyst poisons, for example, water and/or traces of oxygen may participate in and enhance the oxidation of some poisons. The preferred substantially reactant-free fluid may depend upon the nature of the electrode catalyst and, where applicable, the poison to be removed.

The reactant stream and the substantially reactant-free liquid may be in different phases. To accomplish fuel starvation for example, the fuel stream could be gaseous hydrogen or reformate and the substantially fuel-free fluid employed could be liquid water. In conventional fuel cells, it is considered important to manage water inside the fuel to sufficiently hydrate the membrane yet avoid two phase flow since water in the fuel stream inhibits the diffusion of fuel to the anode. According to the present method, an object of the method is to inhibit the supply of fuel to starve at least a portion of the anode.

Figure 5:
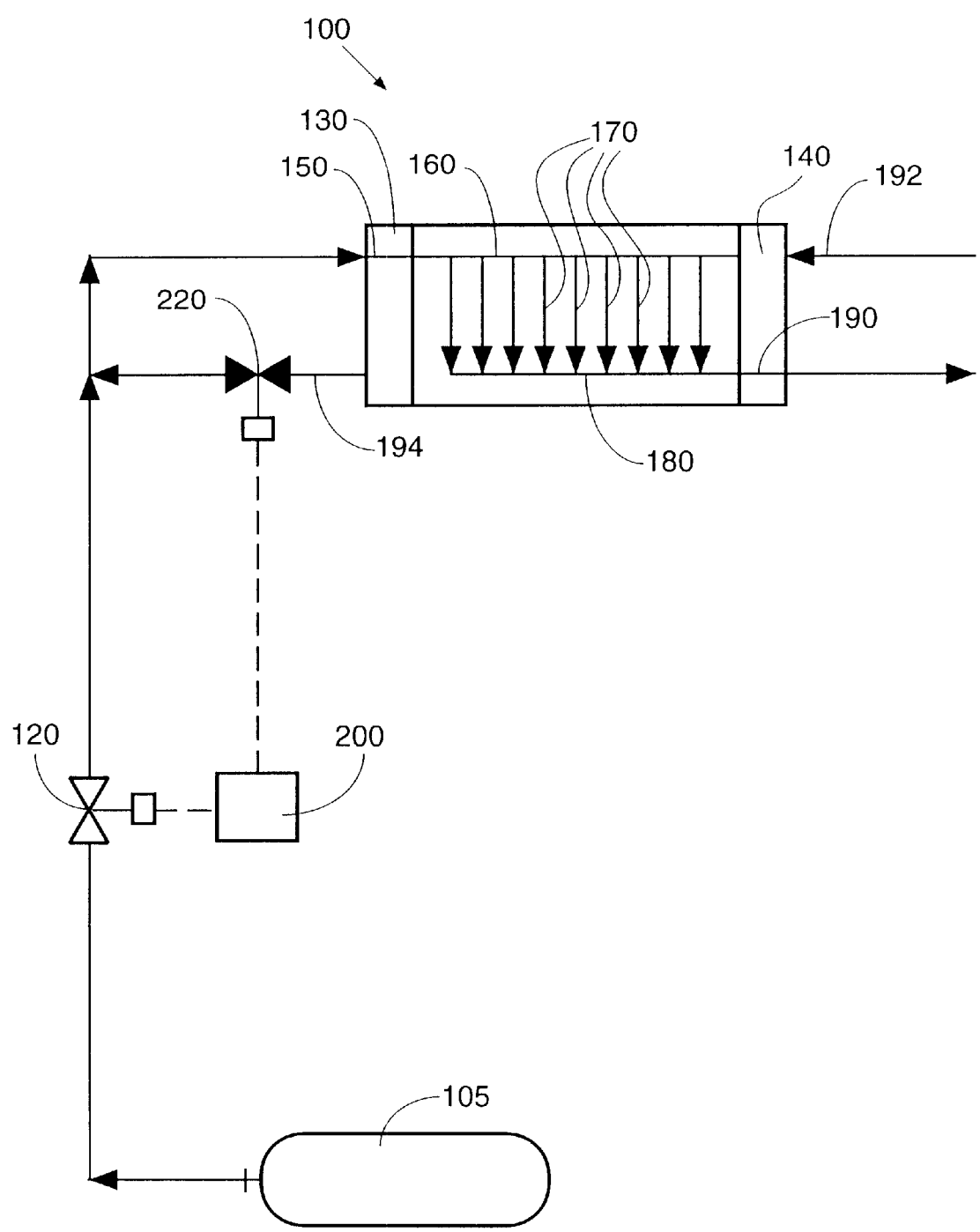

FIG. 5 shows an embodiment wherein reactant starvation is achieved by introducing reactant-free fluid pulses obtained from the exhaust stream of the other reactant supplied to the fuel cell stack. Therein, stack 100 has an inlet for the other reactant 192, for directing the other reactant stream to the other electrodes of fuel cell in stack 100, and an exhaust outlet for the other reactant 194. In the embodiment depicted by FIG. 5, interrupt valve 220 is positioned on a fluid line that connects outlet for the other reactant 194 with a stack reactant supply system. In operation, reactant supply valve 120 is periodically momentarily closed while interrupt valve 220 is periodically momentarily opened to introduce pulses of the exhaust stream for the other reactant (from the other electrodes of the fuel cell) into the reactant flow fields. An advantage of utilizing the exhaust stream of the other reactant as the substantially reactant-free fluid is that it typically contains a residual amount of the other reactant that can help in the removal of poisons from the starved electrode. Another advantage of utilizing the exhaust stream of the other reactant is that this fluid stream is already present in the fuel cell system, so there is no need to provide a separate substantially reactant-free fluid source. While it is possible to consider introducing pulses of a fuel exhaust stream exhaust to effect oxidant starvation, the embodiment of FIG. 5 is most likely to be considered to effect fuel starvation by introducing pulses of the oxidant exhaust stream into the fuel stream. Yet another advantage of utilizing the oxidant exhaust stream in this case is that the oxidant exhaust stream also typically contains moisture which is useful for humidifying the anode and the water may also participate in the oxidation reactions which result in the oxidation and removal of poisons from the anode.

Other fluid streams present in the fuel cell system may be suitable for use as the substantially reactant-free fluid (for example, process streams, and burner exhaust gases). For purposes of fuel starvation of the anode, a process stream such as methane may be diverted to stack 100, from upstream of the reformer, to act as the substantially fuel-free fluid. Alternatively, fuel cell systems employing reformers typically use a burner as part of the reforming apparatus. The reforming process may use fuel cell oxidant and fuel exhaust streams as combustion gases. After combustion, the burner exhaust stream may be suitable for use as the substantially reactant-free fluid. Also the exhaust stream from the anode, which with dilute fuel streams has a substantially lower fuel content than the inlet fuel stream, may be suitable.

Figure 6:
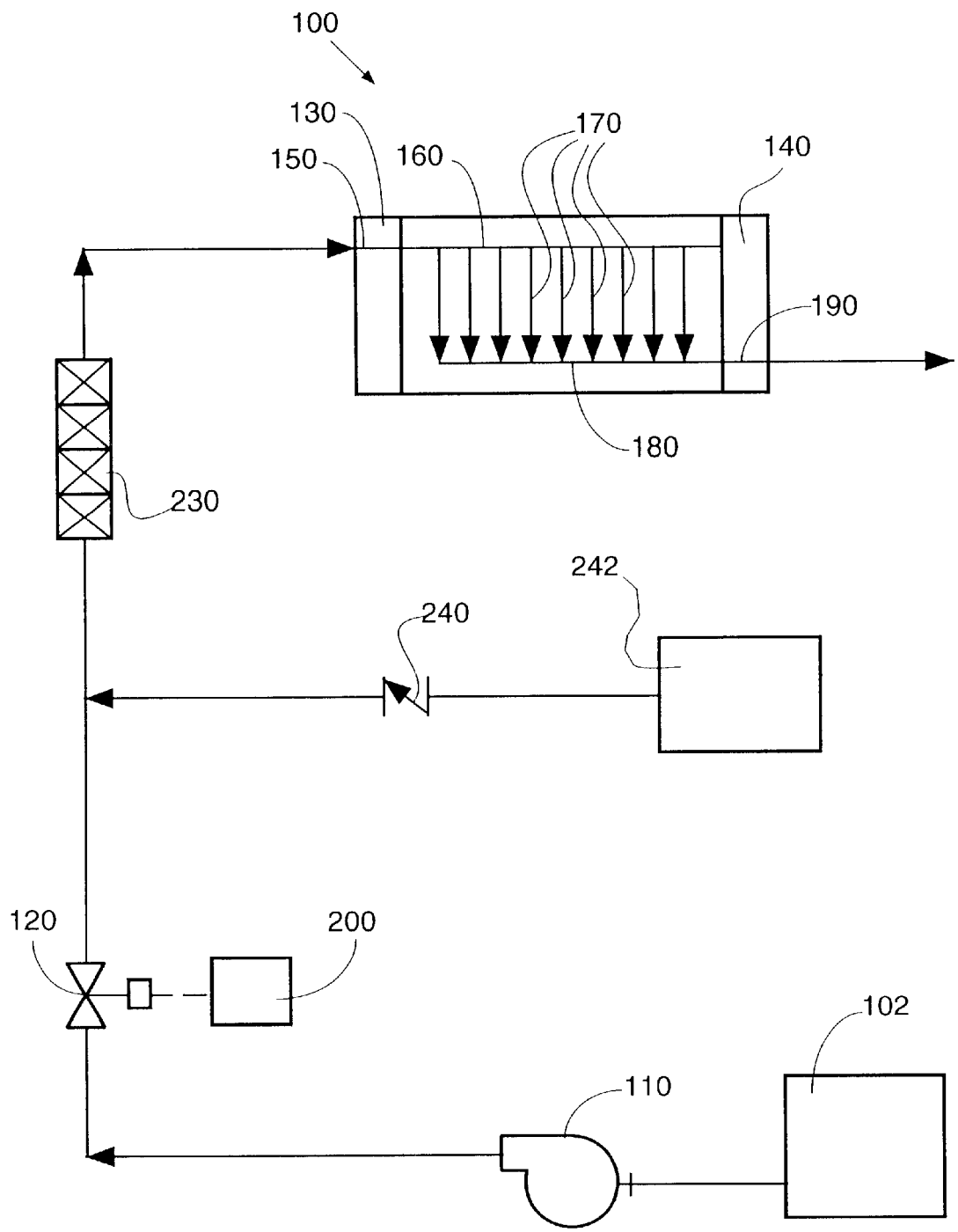

In operation, using the embodiment of FIG. 6, a continuous supply of substantially reactant-free liquid, such as water is added to and mixed with a liquid reactant stream comprising, for example, methanol fuel supplied to the anodes in a direct methanol fuel cell system. A static mixer 230 may be used to improve the mixing of the two liquids. Check valve 240 prevents reactant from contaminating the substantially reactant-free liquid stored in vessel 242. Reactant supply valve 120 is periodically momentarily closed, so that pulses of only the substantially reactant-free liquid are introduced into the reactant stream that is directed to stack 100.

An advantage of using a substantially reactant-free fluid comprising water with non-aqueous reactant streams is that it will also hydrate the membrane and reduce the need for humidifying the reactant streams.

In other embodiments, the method may also be used to cool stack 100 by introducing a fluid that is cooler than stack 100 as the substantially reactant-free fluid pulse. An advantage of using a coolant as the substantially reactant-free fluid is that it may reduce or eliminate the need for separate cooling plates and channels, thereby increasing the power density of the fuel cell stack. Further, if the cooling function is combined with the reactant supply system this reduces the complexity of the overall fuel cell system. Where it is anticipated that the fuel cell will be subjected to an operating environment where ambient temperatures will be less than 0° C., a non-corrosive substantially reactant-free cooling fluid with a freezing point lower than that of water may be preferred.

Controller 200 is shown in all of the illustrated embodiments. Controller 200 controls the interruptions of the reactant supply stream by controlling both the opening and closing of valves, or the operation of pump 110. In one embodiment, controller 200 comprises a timer which causes controller 200 to periodically open and close reactant supply valve 120 and/or interrupt valve 210, at regularly spaced intervals. In other embodiments, controller 200 responds to monitored operating parameters such as cell performance to govern the time intervals between interruptions in the reactant supply and the duration of such interruptions. The monitored operating parameters may include any of the fuel cell operating parameters described herein.

The duration of the reactant supply interruptions may be of fixed length or controller 200 may close reactant supply valve 120 until reactant starvation conditions are momentarily reached in at least a portion of the electrodes in stack 100. Controller 200 may also control interrupt valve 210 in coordination with reactant supply valve 120 so that when reactant supply valve 120 is opened, interrupt valve 210 is closed, and vice versa.

Figure 4:
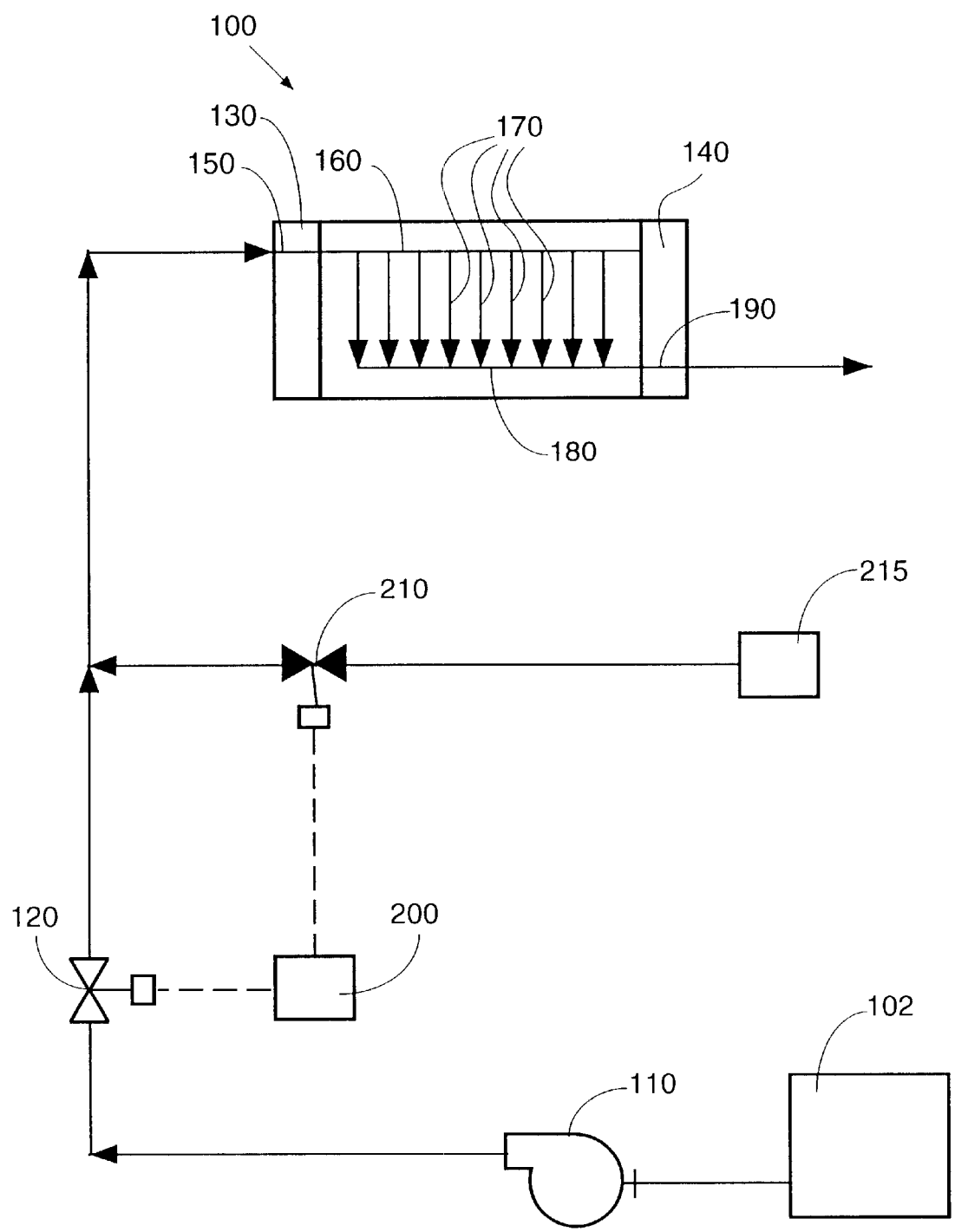

In the embodiments of FIGS. 4 and 5, reactant supply valve 120 may not be necessary, for example, if the pressure of the substantially reactant-free fluid is higher than the pressure of the reactant stream at the point of introduction. Then only interrupt valve 210 may be needed to introduce the higher pressure fluid into stack 100, thus interrupting the reactant supply stream.

Figure 7:
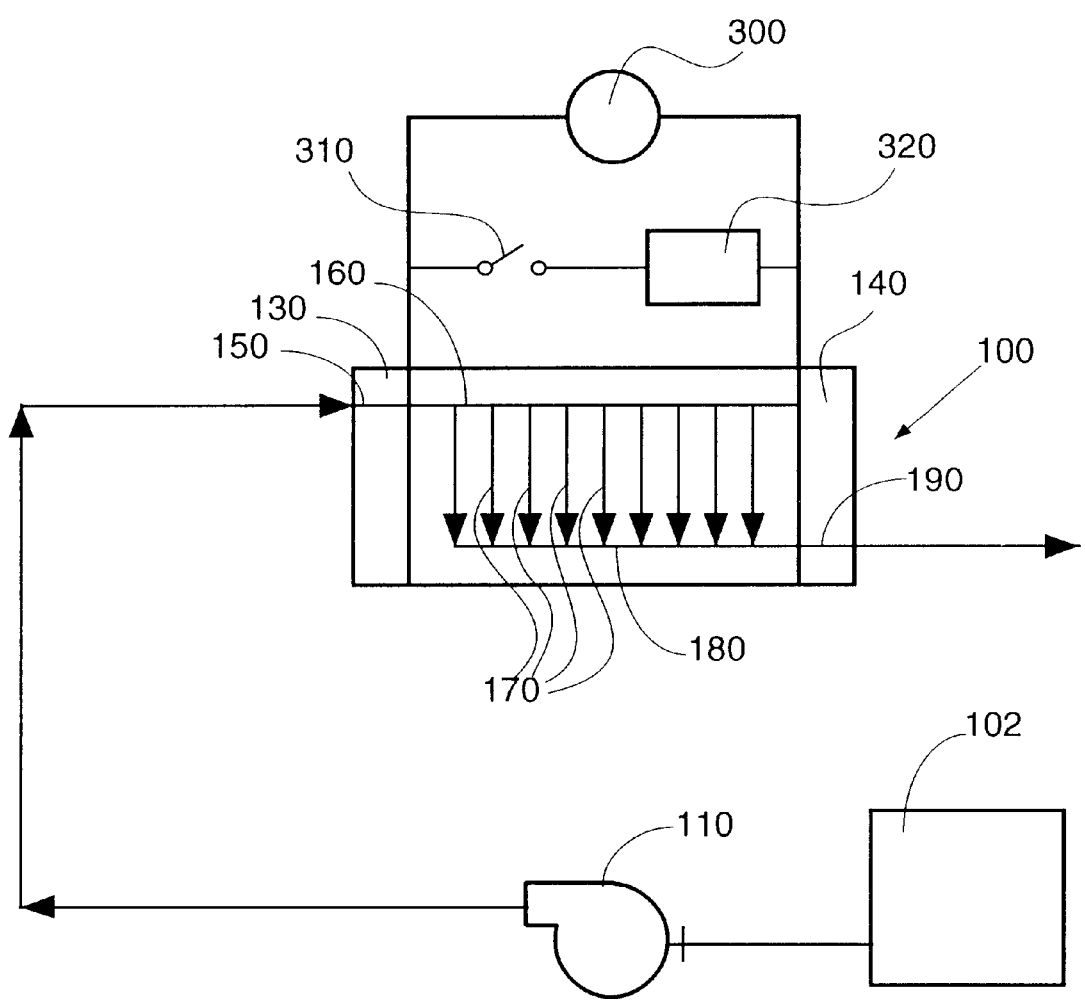

FIG. 7 depicts a stack 100 that is connected to electrical load 300. In the embodiment illustrated by FIG. 7, one or both sets of fuel cell electrodes (i.e., cathodes and anodes) in stack 100 may be reactant starved by operating switch 310 to connect transient load 320 to stack 100, without correspondingly increasing the rate of reactant supplies to the electrodes. (Whether one or both electrodes are momentarily reactant starved as a result will depend on the reactant stoichiometry prior to connection of the transient load and the magnitude of the transient load.) Transient load 320 demands electrical current that can cause one or both reactants in stack 100 to be consumed more rapidly than reactants are supplied. The frequency and duration of the reactant starvation can be controlled, as with the other embodiments by a controller (not shown), except that in this embodiment the controller operates switch 310.

The controller may be used to periodically operate switch 310 at regular or variable time intervals. One or more operating parameters of the fuel cell may be monitored to determine when the controller will automatically operate switch 310. The same, or additional operating parameters may be monitored to determine how long transient load 320 is connected to receive electrical power from stack 100.

The power drawn by transient load 320 may be variable so that the severity of the reactant starvation is adjustable.

The transient load may comprise a capacitor which is connected in parallel so that an electrical charge may be released to power load 300 when fuel cell power output is reduced by electrocatalyst poisoning or rejuvenation cycles.

EXAMPLE 1

Figure 8:
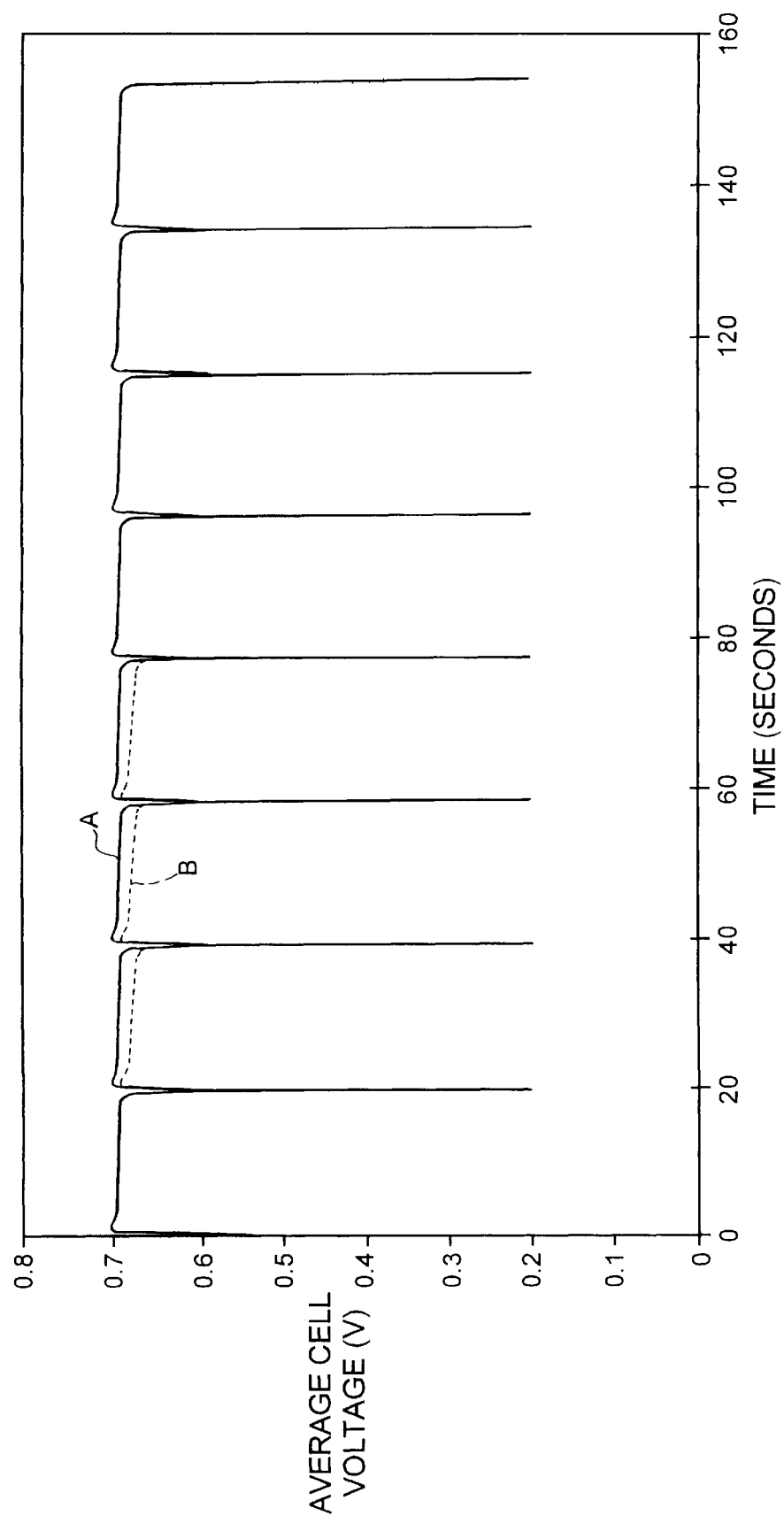
FIG. 8 is a plot of average cell voltage as a function of time, showing the effect of periodic fuel supply interruptions.

FIG. 8 is a plot of average cell voltage as a function of time for a Ballard Mark 8 fuel cell stack supplied with a reformate fuel stream having a composition of 75% hydrogen, 25% carbon dioxide and trace amounts of impurities, including poisons (e.g. 20 ppm or 100 ppm carbon monoxide). The fuel cell was operating at a current density of 600 amps per square foot. In order to achieve fuel starvation, the reformate fuel stream supply to the stack was interrupted for 1 second every 18 seconds by closing a fuel supply valve. FIG. 8 shows that after periodic momentary fuel starvation cycles the fuel cell performance was restored and enhanced. It is believed that the enhanced fuel cell performance was the result of electrocatalyst rejuvenation caused by the removal of poisons from the electrocatalyst.

As shown by plots A and B, the periodic fuel starvation cycles caused momentary decreases in the average cell voltage. Plot A represents data obtained from an operating fuel cell supplied with a reformate fuel stream containing 10 ppm carbon monoxide. The average cell voltage with the voltage dips taken into account was 0.673 V. Plot B (dotted lines) represents data obtained from an operating fuel cell supplied with a reformate fuel stream containing 100 ppm carbon monoxide. At 100 ppm carbon monoxide, the average cell voltage with the voltage dips taken into account was 0.660 V.

However, the data from both plots A and B show that cell voltage remained positive, thereby avoiding the problem of cell reversal. Therefore, FIG. 8 shows that it is possible, using an apparatus such as that illustrated in FIG. 2, to periodically starve the fuel cell and remove poisons from the anode electrocatalyst while still generating a continuous supply of power.

EXAMPLE 2

Cell voltage was determined against time for a single cell Ballard Mk5E fuel cell using as the anode catalyst a platinum/ruthenium mixture, where nitrogen pulses were introduced into the fuel stream directed through the fuel flow field in order to achieve periodic fuel starvation. The reformate fuel stream included 72% hydrogen, 19% carbon dioxide and 40 ppm carbon monoxide. The fuel cell was operating at a current density of 500 amps per square foot. The fuel supply was periodically interrupted and nitrogen pulses were introduced for 0.5 second durations at 5 second intervals. The average cell voltage over a two hour test period was about 0.46 V, with high and low fluctuations taken into account. The upper performance limit (i.e. peak cell voltage) was about 0.48 V and the lower performance limit was about 0.4 V. By using shorter interruptions, it is believed that, substantially fuel-free fluid pulses move through the flow field resulting in localized fuel starved portions of the anode, while the majority of the anode remains electrochemically active. The difference between the upper and lower performance limits is about 0.08 volts. It is believed that this is the reason for the reduction in the magnitude of cell voltage fluctuations, compared to those of FIG. 8 where average cell voltage fluctuated by approximately 0.5 volts between a high of about 0.7 volts and a low of about 0.2 volts.

EXAMPLE 3

Two direct methanol solid polymer fuel cells (DMFCs) were constructed and subjected to prolonged testing. The first DMFC was subjected to periodic fuel starvation during prolonged testing while the second comparative DMFC was not. Both DMFCs were of similar construction, but the second comparative DMFC had a larger active area. The anodes and cathodes in each comprised unsupported platinum/ruthenium and platinum catalysts respectively. The membrane electrolyte employed in each was Nafion™. During prolonged testing, the fuel supplied was a 0.4M methanol in aqueous solution at 3 bar absolute pressure. Prolonged testing was carried out at an operating temperature of 110° C. and constant current densities of 200 mA/cm$^2$ and 100 mA/cm$^2$ for the first and second DMFCs respectively. The fuel stoichiometry was 3 during testing in both cases. Compressed air was used as the oxidant supply at 3 bar absolute pressure. The periodic fuel starvations on the first DMFC were performed once per day by reducing the fuel flow by 80% for approximately ten seconds which resulted in a fuel cell voltage drop of about 0.06 to 0.07 volts during starvation. Thus the DMFC was still generating useful power during starvation.

Figure 9A:
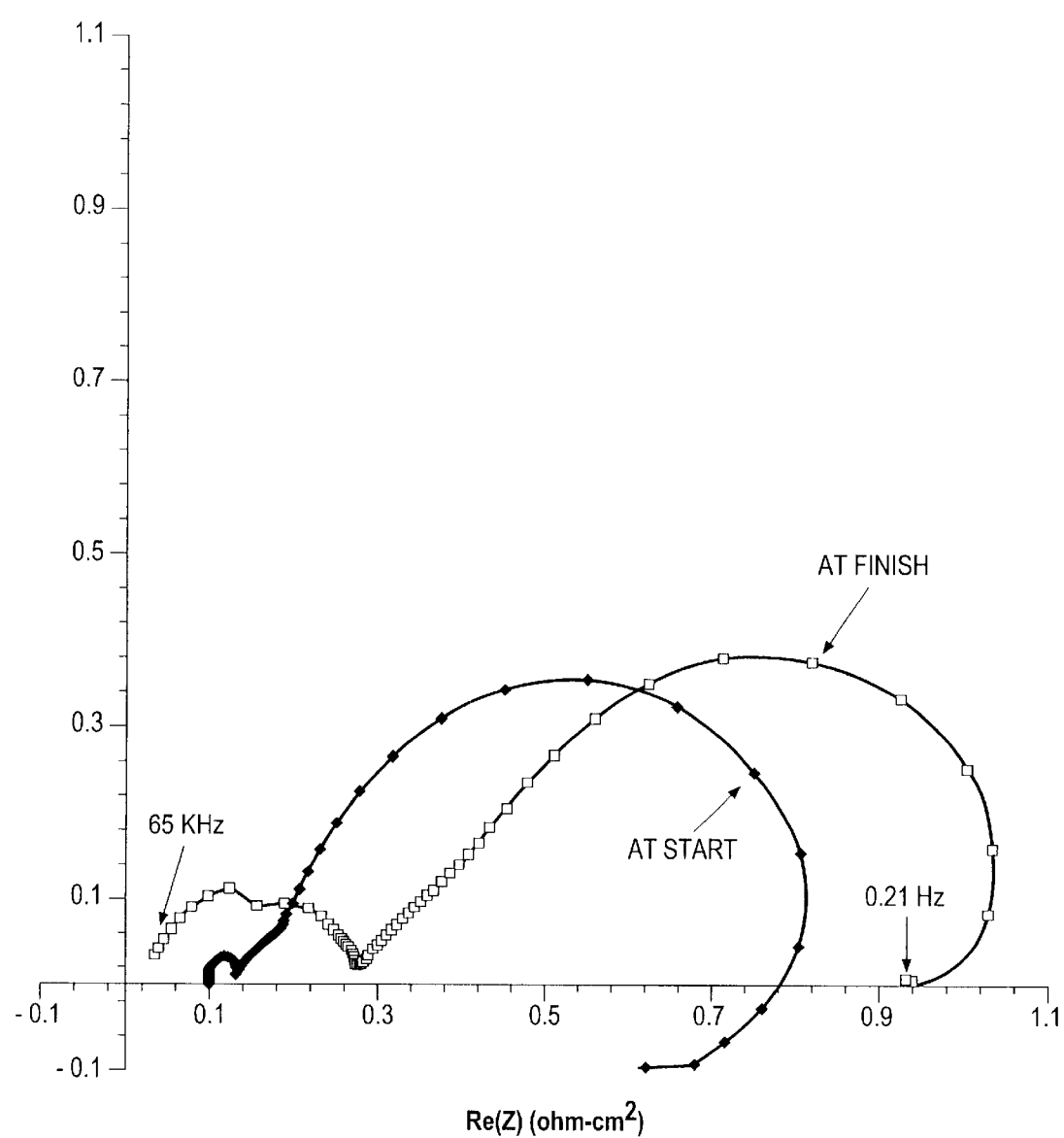
FIG. 9A is a comparative plot of the in situ AC impedance of a fuel cell at the start and at the finish of an extended operating period. This fuel cell was subjected to periodic fuel starvation over the extended operating period.

AC impedance spectra were taken for both DMFCs before and after prolonged testing. The AC impedance spectra were taken in situ with the cells under load at a current density of 150 MA/cm$^2$. Further, a nitrogen stream was supplied to the cathodes instead of air so that the cathodes acted as hydrogen reference electrodes (since hydrogen is generated at the cathodes under these conditions). Thus, the spectra are an indication of the membrane and anode impedances under these circumstances. The first DMFC subjected to periodic fuel starvation was tested for 1090 hours. FIG. 9A compares the AC impedance spectra of the first DMFC at the start and finish of this extended operating period. (FIG. 9*a* is normalized with regards to fuel cell electrode area, i.e. it is plotted in terms of resistance per unit area.) The semi-circle on the left of each plot representing the impedance at higher frequencies has increased substantially in radius after prolonged testing (by about 0.2 ohms-cm$^2$). This semi-circle is attributed to the impedance of the membrane electrolyte. The radius of the semi-circle on the right of each plot representing the impedance at lower frequencies has not changed substantially after prolonged testing. This semi-circle is attributed to the kinetic impedance of the anode.

The second, comparative DMFC was prolonged tested for only 400 hours. FIG. 9B compares the AC impedance spectra of the second, comparative DMFC at the start and finish of this extended operating period. In this case, there was a substantial increase in both the higher frequency semi-circle (on the left of the plots) and the lower frequency semi-circle (on the right of the plots).

The use of periodic fuel starvation in the first DMFC thus appears to prevent a substantial increase in the lower frequency impedance after prolonged testing. Further, the AC impedance results suggest that the electrode kinetics, in particular those of the anode, have not been degraded significantly as a result. This is consistent with the technique being effective to rejuvenate the anode via periodic fuel starvation and thereby prevent anode degradation.

EXAMPLE 4

A DMFC similar to those in Example 3 was constructed and was operated briefly under similar conditions. This time however, the fuel supplied was a 0.5M methanol in aqueous solution at 1 bar absolute pressure and the operating temperature was 95° C. A polarization plot (cell voltage versus current density) for this DMFC was then obtained. (This is done by decreasing the load across the fuel cell terminals in steps in order to obtain specific increasing current outputs and measuring the fuel cell voltage. The flow rate of the reactants supplied remained constant throughout the polarization test. The fuel cell was allowed to run at each specific current for about 5 minutes.) After obtaining the polarization data, the fuel cell was operated at a greater current density of 500 mA/cm$^2$, again without changing the reactant flow rates. Compared to the conditions experienced during the polarization test, the fuel cell experiences a starvation condition at both anode and cathode as a result of the current density increase (i.e., the anode voltage becomes more positive and the cathode voltage more negative and the overall cell voltage drops). Another polarization plot was obtained immediately thereafter.

FIG. 10 shows the polarization curves obtained before and after the transient operation at high current density. The latter shows a generally higher voltage over the measured range. Thus fuel cell performance has been improved by temporarily operating at higher current density (i.e., by connecting a reduced electrical resistance to the DMFC and thereby starving both electrodes).

EXAMPLE 5

An experimental DMFC similar to those in Example 3 was constructed and was operated at constant current output (200 MA/cm$^2$) under similar conditions. In this trial however, hydrogen was supplied to the cathode such that the cathode acted as a dynamic hydrogen reference electrode (DHE). The anode potential versus DHE as a function of time was monitored and was observed to increase slowly with time (indicative of an increase in anode overvoltage) to about 0.31 V. Without changing the fuel flow rate, the load across the DMFC was then temporarily adjusted so as to increase the current density to 500 mA/cm$^2$ for about half a minute whereupon the potential rose to 0.76 V (this corresponds to a decrease in cell voltage from roughly 0.5 to 0.1 V in a similar DMFC supplied with oxidant). Thus, anode starvation was caused by this temporary action. The current density was then returned to 200 mA/cm$^2$ and the potential recovered to about 0.30 V, indicative of an improvement in the overvoltage at the anode. After about 30 minutes of continued operation, the anode potential rose again to about 0.31 V. The same temporary starvation conditions were applied again with similar results. DMFC performance could thus be repeatedly improved by periodic starvation at the electrodes.

EXAMPLE 6

A DMFC similar to those in Example 3 was constructed and was operated at constant current output (200 mA/cm$^2$) under similar conditions, except the oxidant stoichiometry was 2. The DMFC voltage as a function of time was monitored and was observed to decrease slowly with time to about 0.46 V. Then, the oxidant stoichiometry was temporarily reduced to 1.3 by reducing the flow of oxidant thereby causing a temporary oxidant starvation condition. Starvation lasted for about ten seconds and the DMFC voltage fell to about 0.17 V. After restoring the original oxidant stoichiometry, the DMFC recovered to about 0.49 V, an improved performance level. After about half a minute, the cell voltage dropped to about 0.47 V and then to about the 0.46 V level again after about four minutes. DMFC performance could thus be improved by temporary oxidant starvation, likely due to an effect on water management.

EXAMPLE 7

The DMFC of Example 3 that was subjected to periodic fuel starvation conditions was later tested to determine cell performance as a function of air stoichiometry. This was accomplished by initially operating the DMFC at an air stoichiometry of 3 and determining the cell voltage. The air stoichiometry was then reduced stepwise by reducing the air flow rate (a constant current density of 200 mA/cm$^2$ was maintained throughout) and again determining the voltage once it stabilized (after about 5 to 10 minutes). The air stoichiometry was then increased stepwise again to the initial value of 3. FIG. 11 is a plot of the resulting fuel cell voltage as a function of air stoichiometry. The drop in DMFC voltage at the low air stoichiometries employed is indicative of oxidant starvation. A hysteresis is observed in the voltage curve. The fuel cell voltage was generally higher at any given stoichiometry following the oxidant starvation, indicating a performance improvement.

EXAMPLE 8

A single Ballard Mk513 fuel cell was subjected to freeze/thaw cycles in between periods of operation at a normal temperature of 80° C. The anode and cathode in the fuel cell comprised supported platinum/ruthenium and platinum catalysts respectively. The membrane electrolyte employed was Nafion™. The fuel and oxidant streams employed were humidified hydrogen and humidified air respectively. The operating current density was 500 mA/cm$^2$. A significant performance loss (i.e., drop in output voltage) was observed after several freezing cycles down to temperatures ranging from −40 to −25° C. During operation, the oxidant supply was then periodically interrupted by closing the oxidant inlet for two seconds at one minute intervals. The average fuel cell voltage under load was 0.54 V before interrupting the oxidant supply. After three of these interruption cycles, the cell voltage had recovered to 0.58 V. Thus, cell performance had been improved as a result of this periodic oxidant starvation.

EXAMPLE 9

Another single Ballard Mk513 fuel cell similar to that of Example 8 was subjected to freeze/thaw cycles down to −25° C. in between periods of operation at a normal temperature of 80° C. This time, however, the fuel stream employed was a reformate having a composition of 64% hydrogen, 22% carbon dioxide, 13% nitrogen, 40 ppm carbon monoxide and other trace amounts of impurities. Again, a drop in performance was observed after several freezing cycles. Next, the oxidant supply was periodically interrupted during operation by closing the oxidant inlet for five seconds at one minute intervals. The average fuel cell voltage under load was 0.31 V before interrupting the oxidant supply. After three of these interruption cycles, the cell voltage had recovered to 0.36 V. Testing continued and performance losses were again noticed after subsequent operating and freezing cycles. The oxidant supply was again periodically interrupted and a voltage increase of about 20 mV was observed. Thus, cell performance had again been improved by this periodic oxidant starvation.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the spirit and scope of the invention.

What is claimed is:

1. A method of operating a solid polymer fuel cell, said method comprising:

supplying an oxidant stream to the cathode of said fuel cell;

supplying a fuel stream to the anode of said fuel cell;

monitoring an operational parameter of said fuel cell; and periodically oxidant starving at least a portion of said cathode in response to the monitored parameter, while continuing to produce electrical power from said fuel cell.

2. The method of claim 1 wherein said periodically oxidant starving comprises periodically interrupting the supply of said oxidant stream to said fuel cell cathode.

3. The method of claim 2 wherein said fuel cell is one of a plurality of fuel cells in a fuel cell stack.

4. The method of claim 3 wherein the supply of oxidant to each cathode of said plurality of fuel cells is not simultaneously interrupted.

5. The method of claim 2 wherein the supply of said oxidant stream to said fuel cell cathode is interrupted at regular time intervals.

6. The method of claim 2 further comprising closing a valve downstream of said fuel cell cathode substantially simultaneously with said interruption of supply of said oxidant stream to prevent said oxidant stream from being exhausted from said fuel cell cathode.

7. The method of claim 2 wherein the frequency of the interruption of said oxidant supply stream to said fuel cell cathode is adjusted responsive to said monitored parameter.

8. The method of claim 2 wherein the duration of said interruption of said oxidant supply stream to said fuel cell cathode is adjusted responsive to said monitored parameter.

9. The method of claim 1 wherein said fuel cell is a direct methanol fuel cell.

10. The method of claim 1 wherein said operational parameter is the concentration of catalyst poisoning species in said oxidant stream.

11. The method of claim 1 further comprising periodically fuel starving at least a portion of said anode.

12. The method of claim 11 wherein said fuel and oxidant starvations occur substantially simultaneously.

13. A method of operating a solid polymer fuel cell, said method comprising:

supplying an oxidant stream to the cathode of said fuel cell;

supplying a fuel stream to the anode of said fuel cell; and periodically introducing pulses of a substantially oxidant-free fluid into said oxidant stream upstream of said fuel cell cathode, whereby successive portions of said cathode are oxidant starved.

14. The method of claim 13 wherein said pulses of substantially oxidant-free fluid are introduced into said oxidant stream at regular time intervals.

15. The method of claim 13 further comprising:

measuring an operational parameter of said fuel cell; and adjusting the frequency with which said pulses of substantially oxidant-free fluid are introduced into said oxidant stream responsive to said measured operational parameter.

16. The method of claim 13 further comprising:

measuring an operational parameter of said fuel cell; and adjusting the volume of said pulses of substantially oxidant-free fluid introduced into said oxidant stream responsive to said measured parameter.

17. The method of claim 13 wherein said substantially oxidant-free fluid introduced into said oxidant stream is cooler than the internal operating temperature of said fuel cell.

18. The method of claim 13 wherein said substantially oxidant-free fluid is unreactive at said fuel cell cathode.

19. The method of claim 13 wherein said oxidant stream is a gas stream and said substantially oxidant-free fluid is a gas.

20. The method of claim 19 wherein said substantially oxidant-free gas is selected from the group consisting of nitrogen, argon, and helium.

21. The method of claim 13 further comprising the steps of periodically:

closing an oxidant supply valve to stop the flow of said oxidant stream upstream of said fuel cell; and opening an interrupt valve to introduce a pulse of a substantially oxidant-free fluid stream into said fuel stream.

22. The method of claim 13 wherein said oxidant supply stream is maintained at a lower pressure than said substantially oxidant-free fluid stream, and said method further comprises periodically opening an interrupt valve to introduce a pulse of a substantially oxidant-free fluid stream into said oxidant stream.

23. A method of operating a solid polymer fuel cell, said method comprising:

supplying an oxidant stream to the cathode of said fuel cell;

supplying a fuel stream to the anode of said fuel cell;

periodically oxidant starving at least a portion of said cathode, while continuing to produce electrical power from said fuel cell;

wherein said periodically oxidant starving comprises periodically connecting a transient electrical load to draw electrical power from said fuel cell.

24. The method of claim 23 wherein the rate of supply of said oxidant stream to said fuel cell cathode is not increased in response to the connection of said transient load.

25. The method of claim 23 wherein said transient electrical load comprises a capacitor.

26. The method of claim 23 wherein said transient electrical load is connected to draw electrical power from said fuel cell at regular time intervals.

27. The method of claim 23 further comprising:

monitoring an operational parameter of said fuel cell; and adjusting the frequency with which said transient electrical load is connected to draw electrical power from said fuel cell responsive to said monitored parameter.

28. The method of claim 23 further comprising:

monitoring an operational parameter of said fuel cell; and adjusting the duration for which said transient electrical load is periodically connected to draw electrical power from said fuel cell responsive to said monitored parameter.

29. The method of claim 23 wherein said fuel cell is one of a plurality of fuel cells arranged in a stack, and the periodic connection of said transient load to draw power from each one of said plurality of fuel cells is not simultaneous.

30. A method of operating a fuel cell assembly comprising a plurality of fuel cells, each of said fuel cells comprising an anode and a cathode, said method comprising:

supplying an oxidant stream to said cathodes;

supplying a fuel stream to said anodes; and periodically oxidant starving at least one of said cathodes such that a cell reversal occurs in said at least one of said fuel cells while continuing to generate electrical power from said fuel cell assembly.

31. The method of claim 30 further comprising periodically fuel starving at least one of said anodes.

* * * * *